United States Patent
Bowman et al.

(10) Patent No.: US 10,341,102 B2
(45) Date of Patent: Jul. 2, 2019

(54) DECRYPTING ENCRYPTED DATA ON AN ELECTRONIC DEVICE

(71) Applicant: BlackBerry Limited, Waterloo (CA)

(72) Inventors: Roger Paul Bowman, Kitchener (CA); Dmitri Pechkin, North York (CA)

(73) Assignee: BlackBerry Limited, Waterloo, Ontario (CA)

( * ) Notice: Subject to any disclaimer, the term of this patent is extended or adjusted under 35 U.S.C. 154(b) by 150 days.

(21) Appl. No.: 15/255,960

(22) Filed: Sep. 2, 2016

(65) Prior Publication Data

US 2018/0069699 A1 Mar. 8, 2018

(51) Int. Cl.
*H04L 9/14* (2006.01)
*H04L 9/00* (2006.01)
(Continued)

(52) U.S. Cl.
CPC ............... *H04L 9/14* (2013.01); *H04L 9/002* (2013.01); *H04L 9/006* (2013.01); *H04L 9/0631* (2013.01); *H04L 9/0643* (2013.01); *H04L 9/0822* (2013.01); *H04L 9/0841* (2013.01); *H04L 9/0861* (2013.01); *H04L 9/0894* (2013.01); *H04L 9/3066* (2013.01)

(58) Field of Classification Search
CPC ........................................................ H04L 9/14
See application file for complete search history.

(56) References Cited

U.S. PATENT DOCUMENTS 5,144,665 A * 9/1992 Takaragi ............... H04L 9/0838
380/279
5,537,474 A * 7/1996 Brown .................. H04M 3/382
380/248
(Continued)

FOREIGN PATENT DOCUMENTS

AU 2007216818 10/2007
EP 1595381 11/2005
(Continued)

OTHER PUBLICATIONS

Chang et al.; A new multi-stage secret sharing scheme using one-way function; Published in: Newsletter ACM SIGOPS Operating Systems Review; vol. 39 Issue 1, Jan. 2005; pp. 48-55; ACM Digital Library (Year: 2005).*

(Continued)

*Primary Examiner* — Bradley W Holder
(74) *Attorney, Agent, or Firm* — Fish & Richardson P.C.

(57) ABSTRACT

Systems, methods, and software can be used to encrypt and decrypt data. In some aspects, a decryption request to decrypt the encrypted data is received from an application on an electronic device. A first secret key from a shared secret is generated. The shared secret is generated based on a master private key and an ephemeral public key associated with the encrypted data. A first encrypted secret key is generated using the first secret key and a context key. The context key is generated based on the master private key. A first portion of the encrypted data is decrypted using the first secret key. A second secret key is generated from the first secret key. The first secret key is deleted. At least a segment of the decrypted first portion of the encrypted data is sent to the application.

20 Claims, 6 Drawing Sheets

(51) Int. Cl.
*H04L 9/06* (2006.01)
*H04L 9/08* (2006.01)
*H04L 9/30* (2006.01)

(56) References Cited

U.S. PATENT DOCUMENTS

| | | | |
|---|---|---|---|
| 6,069,952 A * | 5/2000 | Saito | G06F 21/10 |
| | | | 348/E7.056 |
| 6,963,971 B1 | 11/2005 | Bush et al. | |
| 7,903,820 B2 | 3/2011 | Waisbard | |
| 8,078,869 B2 | 12/2011 | Adams et al. | |
| 8,386,778 B2 | 2/2013 | Adams et al. | |
| 9,154,469 B2 | 10/2015 | Adams et al. | |
| 9,178,699 B2 | 11/2015 | Lambert et al. | |
| 9,342,699 B2 | 5/2016 | Bowman et al. | |
| 9,825,919 B2 | 11/2017 | Lambert et al. | |
| 2005/0235148 A1 | 10/2005 | Scheidt et al. | |
| 2006/0253396 A1 * | 11/2006 | Ohkawa | G06Q 20/382 |
| | | | 705/50 |
| 2006/0265595 A1 | 11/2006 | Scottodiluzio | |
| 2007/0033392 A1 * | 2/2007 | Ganesan | H04L 9/0822 |
| | | | 713/155 |
| 2007/0101133 A1 | 5/2007 | Liu et al. | |
| 2007/0165844 A1 | 7/2007 | Little | |
| 2008/0219451 A1 * | 9/2008 | Ju | G06F 21/10 |
| | | | 380/282 |
| 2010/0153728 A1 | 6/2010 | Brown | |
| 2011/0138192 A1 * | 6/2011 | Kocher | G06F 21/602 |
| | | | 713/189 |
| 2011/0208970 A1 | 8/2011 | Brown et al. | |
| 2011/0270748 A1 | 11/2011 | Graham et al. | |
| 2011/0307706 A1 | 12/2011 | Fielder | |
| 2012/0300925 A1 | 11/2012 | Zaverucha et al. | |
| 2013/0019096 A1 | 1/2013 | Palzer et al. | |
| 2013/0145160 A1 | 6/2013 | Bursell | |
| 2013/0287207 A1 | 10/2013 | Zaverucha et al. | |
| 2013/0290712 A1 | 10/2013 | Zaverucha et al. | |
| 2013/0290713 A1 | 10/2013 | Zaverucha et al. | |
| 2015/0003615 A1 | 1/2015 | Vanstone et al. | |
| 2015/0124961 A1 | 5/2015 | Lambert et al. | |
| 2015/0127952 A1 | 5/2015 | Bowman et al. | |
| 2015/0163056 A1 * | 6/2015 | Nix | H04L 9/0869 |
| | | | 380/46 |
| 2016/0352706 A1 * | 12/2016 | Peeters | H04L 9/0861 |

FOREIGN PATENT DOCUMENTS

| | | |
|---|---|---|
| EP | 1734723 | 12/2006 |
| EP | 2871798 | 5/2015 |
| EP | 2874151 | 5/2015 |
| EP | 3099003 | 11/2016 |
| IN | 3754/DELNP/2005 | 9/2009 |
| JP | 2010-104018 | 5/2010 |
| KR | 100716529 | 5/2007 |

OTHER PUBLICATIONS

Rifai et al.; An Algorithmic Approach to Securing the Three-Stage Quantum Cryptography Protocol; Published in: 2013 12th IEEE International Conference on Trust, Security and Privacy in Computing and Communications; Date of Conference: Jul. 16-18, 2013; IEEE Xplore (Year: 2013).*
Announcing the Advanced Encryption Standard (AES); Federal Information Processing Standards Publication 197; Nov. 26, 2001; 51 pages.
Menezes et al.; Chapter 7—"Block Ciphers," Handbook of Applied Cryptography, CRC Press 1996, 61 pages.
Menezes et al.; Chapter 8—"Public Key Encryption," Handbook of Applied Cryptography, CRC Press 1996, 38 pages.
Menezes et al.; Chapter 12—"Key Establishment Protocols," Handbook of Applied Cryptography, CRC Press 1996, 54 pages.
Zigbee Specification; Table of Contents; Chapter 4—"Security Services Specification," Zigbee Document 053474r20, Sep. 7, 2012, 118 pages.
European Search Report in European Application No. 14191527.2, dated Apr. 7, 2015, 8 pages.
Extended European Search Report in European Application No. 17187485.2, dated Jan. 26, 2018, 9 pages.
Extended European Search Report in European Application No. 17187477.9, dated Jan. 26, 2018, 8 pages.
Certicom Research, "SEC 1: Elliptic Curve Cryptography," Standards for Efficient Cryptography, May 21, 2009; Version 2.0.
Communication Pursuant to Article 94(3) EPC issued in European Application No. 14191527.2 dated Mar. 21, 2017.
Menezes et al., "Chapter 13: Key Management Techniques," Handbook of Applied Cryptography, CRC Press 1996; pp. 543-590.
Communication Pursuant to Article 94(3) EPC issued in European Application No. 14191527.2 dated Oct. 30, 2017; 8 pages.
NIAP; "Protection Profile for Mobile Device Fundamentals"; Version 2.0; Sep. 17, 2014; 175 pages.
United States Office Action issued in U.S. Appl. No. 15/255,921 dated May 3, 2018, 17 pages.

* cited by examiner

DECRYPTING ENCRYPTED DATA ON AN ELECTRONIC DEVICE

CROSS-REFERENCE TO RELATED APPLICATIONS

This application is a co-pending application of U.S. application Ser. No. 15/255,921, filed on Sep. 2, 2016 entitled "ENCRYPTING AND DECRYPTING DATA ON AN ELECTRONIC DEVICE," the contents of which are incorporated herein by reference.

TECHNICAL FIELD

The present disclosure relates to encrypting and decrypting data on an electronic device.

BACKGROUND

In some cases, electronic devices, including mobile devices or other computer systems, can use public-key encryption algorithms to secure data on the electronic devices. The public-key encryption algorithms include hybrid symmetric/asymmetric schemes. Some enterprises and standards bodies have specified security standards or policies for the treatment of files while an electronic device is locked. For example, the National Information Assurance Partnership (NIAP) requires that data be encrypted with public-key cryptography and that, once the data is encrypted, the encrypted data not be decryptable until the private key holder returns.

DESCRIPTION OF DRAWINGS

Like reference numbers and designations in the various drawings indicate like elements.

DETAILED DESCRIPTION

An electronic device can receive data from a network. Applications on the electronic device can also generate data. In some cases, the electronic device or a partition of the electronic device can be in a locked state while the electronic device continues to receive or generate data. In some cases, an electronic device can be considered to be in a locked state when the device is powered on but most functionalities are unavailable for a user to use. If user authentication is configured, user authentication may be required to access these functionalities when the device is in the locked state. If the user authentication succeeds, the device can transition to an unlocked state. The device can be considered to be in an unlocked state when the device is powered on and the device functionalities are available for the user to use.

The electronic device can encrypt the data received or generated during the locked state and store the encrypted data in a secured storage on the electronic device. The encrypted data cannot be decrypted by entities other than the holder of a master private key that is associated with a public key used to encrypt the data. The master private key can be associated with the electronic device, or an application on the electronic device that encrypts the data.

Some public-key encryption algorithms, e.g., RSA Public-Key Cryptography Standards (PKCS) #1 Encryption Scheme or Elliptic Curve Integrated Encryption Scheme (ECIES), encrypt small amounts of data and use hybrid asymmetric/symmetric schemes. In such instances, the symmetric key is encrypted by a public key, and the symmetric key is used to encrypt the data. When the stream of data is large or arrives in pieces spread out in time, the hybrid scheme will hold the symmetric key during the encryption process, and the key to decrypt the ciphertext remains available. In some instances, the symmetric key remains in the memory of an electronic device during a locked state, and therefore the data can be decrypted by other entities that access the key in the memory.

In some implementations, data can be encrypted using a series of secret keys, where the first secret key in the series of secret keys can be derived from a shared secret that is deleted after the first secret key is generated. Each secret key in the series can be used to encrypt a discrete portion of the data, and each secret key can be used to generate the subsequent secret key in the series and deleted after the subsequent secret key is generated. The shared secret can be established by a key agreement according to Diffie-Hellman or another key agreement protocol. The shared secret can be a random string, e.g., generated by a random number generator or another system, or can be derived in another manner. For example, the shared secret can be established based on a master public key associated with the electronic device. A one-way function can be used to generate the subsequent secret key based on the previous secret key. The one-way function can include a hash function, a key derivation function, a block cipher operation, or another one-way function.

During the decryption process, the shared secret is generated. A first secret key is generated from the shared secret and each secret key is generated based on the previous secret key. The shared secret and the secret key are deleted after the next secret key is generated. Therefore, if the decryption is interrupted, by e.g., a lock event, when the electronic device is decrypting a current portion of the data, the electronic device will re-compute each secret key in the chaining process until the current secret key is obtained. When the current secret key is obtained, the electronic device can resume the decryption by decrypting the current portion of the data using the current secret key. The processing time and power used to recover the current secret key increases as the number of chained secret keys between the shared secret and the current secret key increases. Furthermore, if multiple decryption requests are received on consecutive segments of the same encrypted data file, the electronic device will compute each secret key in the chaining process to generate the current secret key for each decryption request.

In some implementations, a context key can be used to encrypt the current secret key. The context key and the current secret key can be deleted when the electronic device switches to a locked state, but the encrypted current secret key can persist in the storage of the electronic device. When the electronic device switches to an unlocked state and the decryption process resumes, the electronic device can regenerate the context key and decrypt the encrypted current secret key to obtain the current secret key. Furthermore, if multiple decryption requests are received on the same encrypted data file, the electronic device can recover the current secret key from the encrypted current secret key and decrypt the next segments of data. This process can save the processing time and power by recovering the current secret key using a 2-step process. The savings can be significant as the number of chained secret keys increases. FIGS. 1-6 and associated descriptions provide additional details of these implementations.

Figure 1:
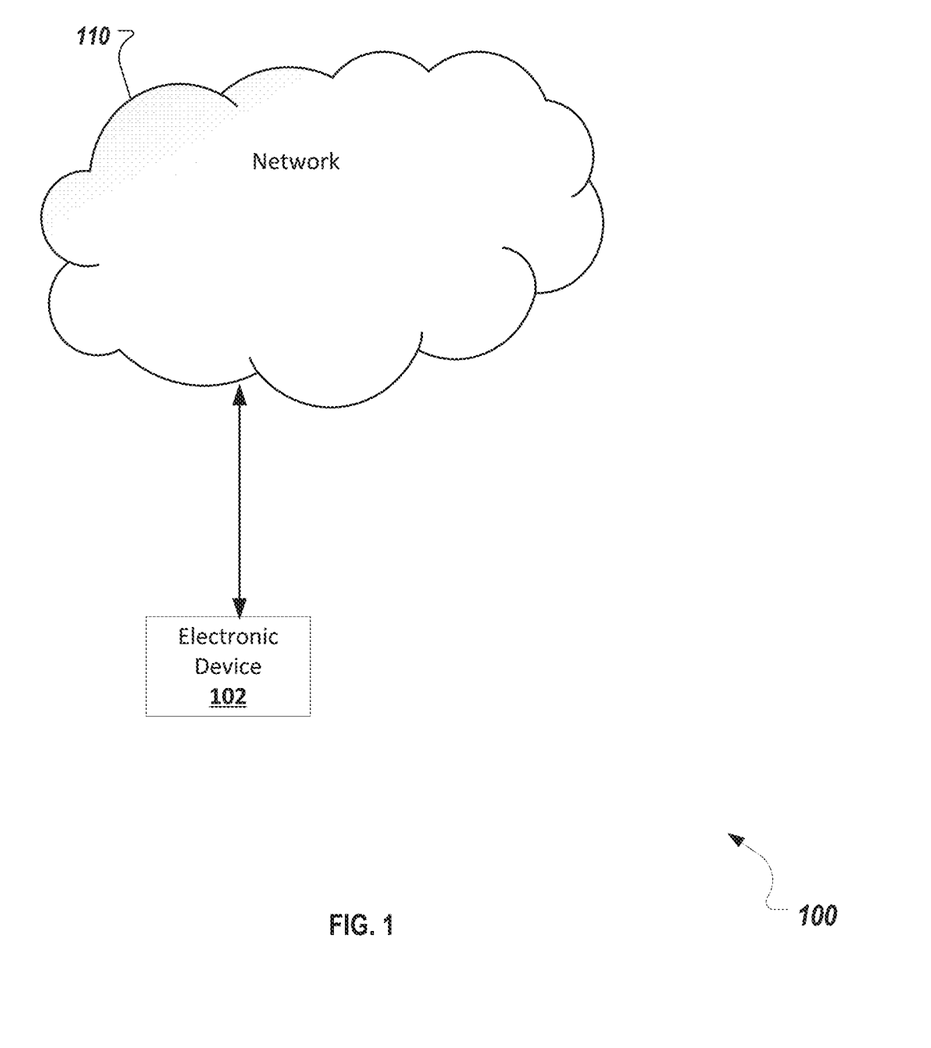
FIG. 1 is an example communication system that encrypts and decrypts data according to an implementation.

FIG. 1 is an example communication system 100 that encrypts and decrypts data according to an implementation. At a high level, the example communication system 100 includes an electronic device 102 that is communicably coupled with a network 110.

The network 110 represents an application, set of applications, software, software modules, hardware, or any combinations thereof that can be configured to provide communications for the electronic device 102 with other devices connected to the network 110, e.g., an application server, an Internet service server, a security service server, other electronic devices, or any combinations thereof. The network 110 includes a wireless network, a wireline network, or a combination thereof. For example, the network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), or LTE-Advanced. In some instances, the core networks may be evolved packet cores (EPCs).

A RAN is part of a wireless telecommunication system which implements a radio access technology, such as GSM, UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

The electronic device 102 represents an application, set of applications, software, software modules, hardware, or any combinations thereof that can be configured to encrypt or decrypt data. The electronic device 102 can receive data from the network 110, encrypt the received data, and store the encrypted data on the electronic device 102. The electronic device 102 can also retrieve encrypted data stored on the electronic device 102, decrypt the encrypted data, process the decrypted data, and send the processed data to the network 110. FIGS. 2-6 and associated descriptions provide additional details of the encryption and the decryption operations.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components as appropriate.

Figure 2:
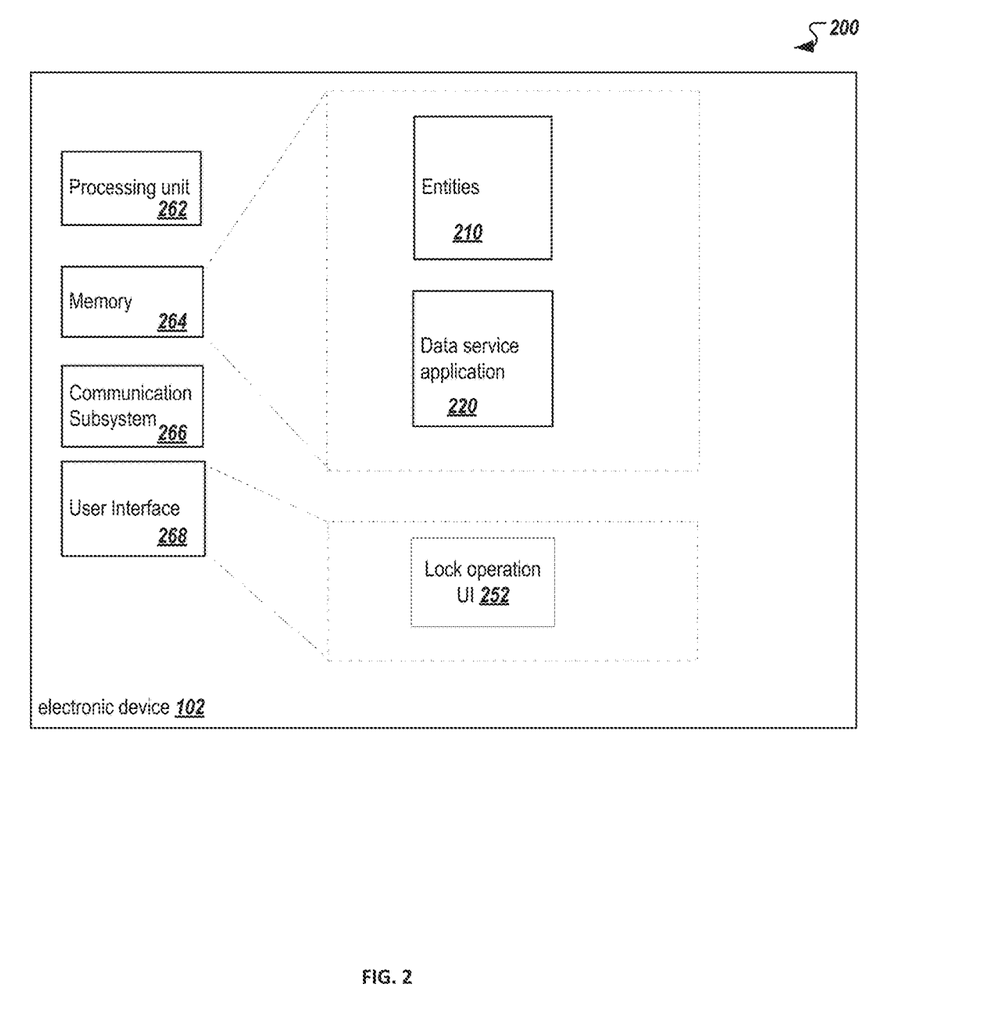
FIG. 2 is a schematic diagram showing an electronic device that encrypts and decrypts data according to an implementation.

FIG. 2 is a schematic diagram 200 showing the electronic device 102 that encrypts and decrypts data according to an implementation. The electronic device 102 includes a processing unit 262, a communication subsystem 266, a user interface 268, and a memory 264. An electronic device may include additional, different, or fewer features, as appropriate.

The example processing unit 262 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 262 can be configured to generate control information, such as a measurement report, or respond to received information, such as control information from a network node. In some cases, the processing unit 262 can also be configured to make a radio resource management (RRM) decision, such as cell selection/reselection information or trigger a measurement report. The processing unit 262 can also include other auxiliary components, such as random access memory (RAM) and read-only memory (ROM).

The example communication subsystem 266 can be configured to provide wireless or wireline communication for data or control information provided by the processing unit 262. The communication subsystem 266 can include, for example, one or more antennas, a receiver, a transmitter, a local oscillator, a mixer, and a digital signal processing (DSP) unit. In some implementations, the communication subsystem 266 can support multiple input multiple output (MIMO) transmissions. In some implementations, the receivers in the communication subsystem 266 can be an advanced receiver or a baseline receiver. Two receivers can be implemented with identical, similar, or different receiver processing algorithms.

Figure 5:
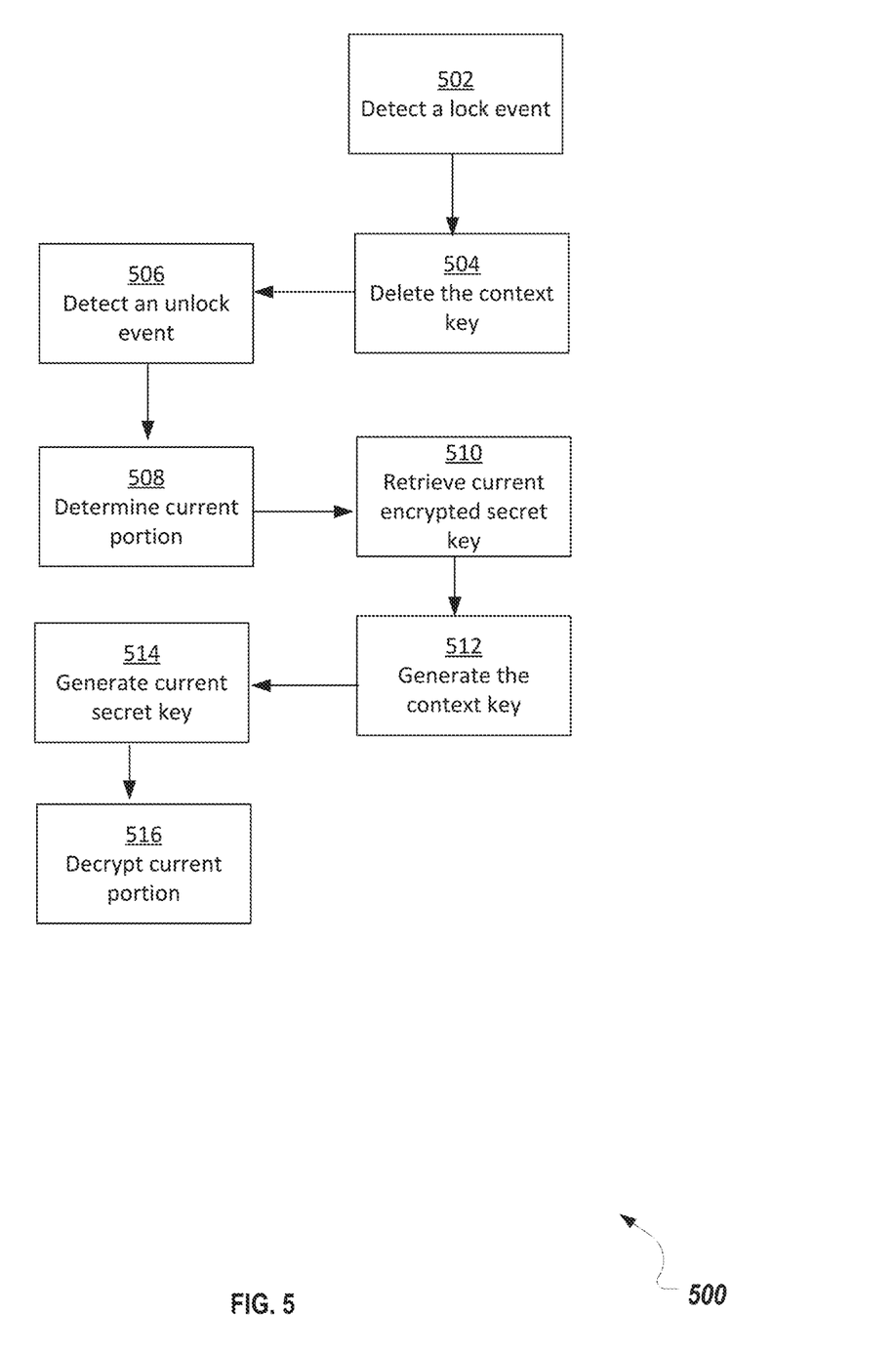
FIG. 5 is a flow diagram showing an example process for decrypting data in association with a lock event or an unlock event according to an implementation.

The example user interface 268 can include, for example, any of the following: one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. As shown in FIG. 2, the example user interface 268 can be configured to present a lock operation user interface 252. The lock operation user interface 252 represents a graphic user interface that outputs one or more user interface objects for a user to lock or unlock a group of resources on the electronic device 102. The lock operation user interface 252 can receive a lock command or an unlock command based on user input. The lock operation user interface 252 can also list one or more groups of resources, or all the resources on the electronic device, for the user to select a particular group of resources to lock or unlock. FIG. 5 and associated descriptions provide additional details of these implementations.

The example memory 264 can be a computer-readable storage medium on the electronic device 102. Examples of the memory 264 include volatile and non-volatile memory, magnetic media, optical media, random access memory (RAM), read-only memory (ROM), removable media, and others. The memory 264 can store an operating system (OS) of the electronic device 102 and various other computerexecutable software programs for performing one or more of the processes, steps, or actions described above.

As shown in FIG. 2, the example memory 264 can include one or more entities 210. The entities 210 include programs, modules, scripts, processes, or other objects that can be configured to send an encryption request or a decryption request. For example, entities 210 can include native applications that are associated with the OS of the electronic device 102. Entities 210 can also include enterprise or personal applications that are installed on the electronic device 102. Further, while illustrated as internal to the electronic device 102, one or more processes associated with an entity may be stored, referenced, or executed remotely. For example, a portion of an entity may be an interface to a web service that is remotely executed. Moreover, an entity may be a child or sub-function of another software application.

The example memory 264 can include a data service application 230. The data service application 230 represents an application, set of applications, software, software modules, hardware, or any combinations thereof that can be configured to encrypt and decrypt data. The data service application 230 can receive an encryption request or a decryption request from an entity 210. The data service application 230 can retrieve public or private keys associated with the entity 210. The data service application 230 can generate shared secret, ephemeral keys, current secret keys, current encrypted secret keys, or any combinations thereof for encryption or decryption operations. The data service application 230 can send the encrypted data or decrypted data to the entity 210 that requests the encryption or decryption operations. FIGS. 3-6 and associated descriptions provide additional details of these implementations.

Turning to a general description, an electronic device, e.g., the electronic device 102, may include, without limitation, any of the following: computing device, mobile device, mobile electronic device, user device, mobile station, subscriber station, portable electronic device, mobile communications device, wireless modem, wireless terminal, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

Figure 3:
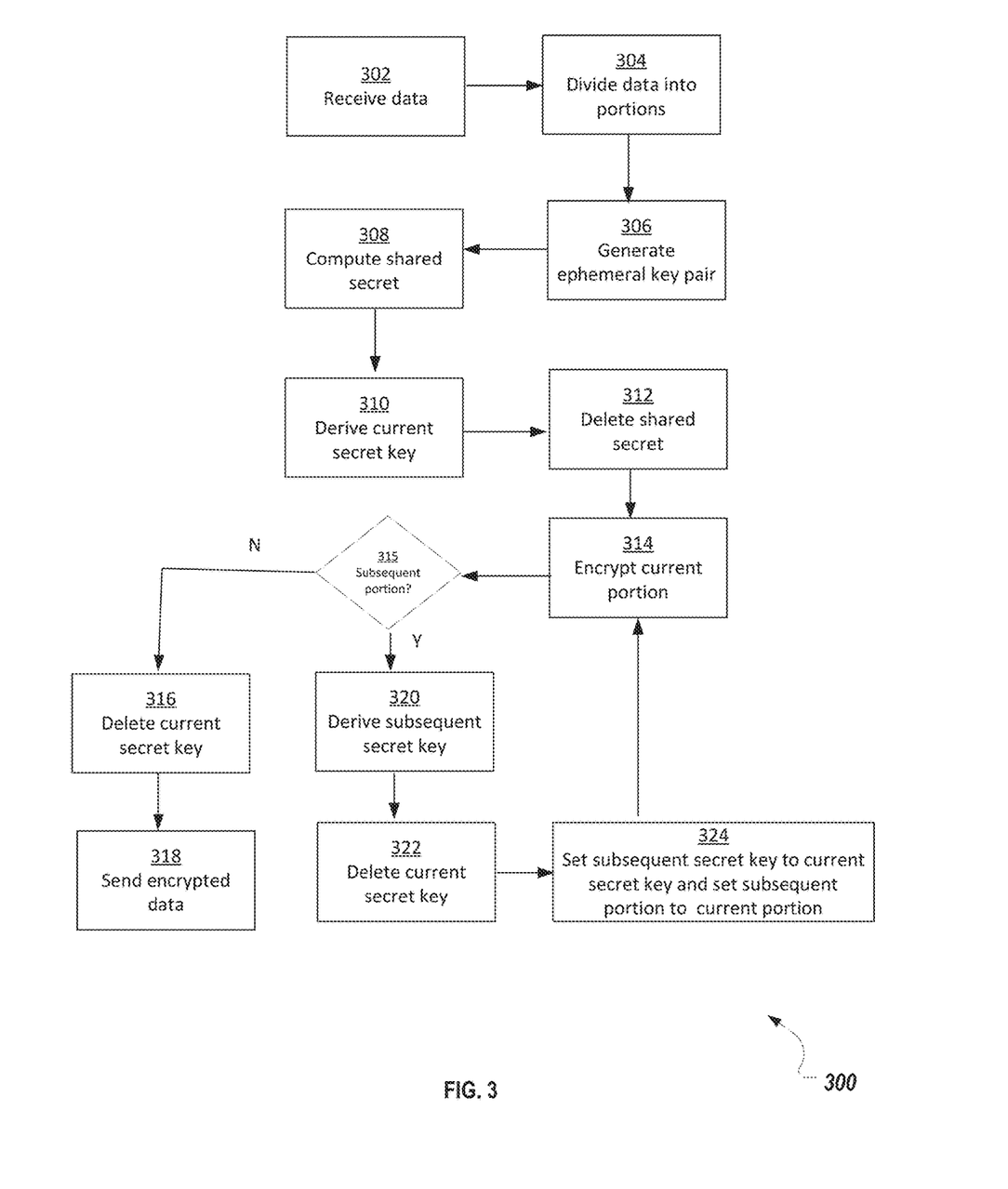
FIG. 3 is a flow diagram showing an example process for encrypting data according to an implementation.

FIG. 3 is a flow diagram showing an example process 300 for encrypting data according to an implementation. The process 300 can be implemented by an electronic device, e.g., the electronic device 102 shown in FIG. 1. The process 300 shown in FIG. 3 can also be implemented using additional, fewer, or different entities. Furthermore, the process 300 shown in FIG. 3 can also be implemented using additional, fewer, or different operations, which can be performed in the order shown or in a different order. In some instances, an operation or a group of the operations can be iterated or repeated, for example, for a specified number of iterations or until a terminating condition is reached.

The example process 300 begins at 302, where data to be encrypted is received. The data can be any type of data, e.g., a message received over a network or a file stored on the electronic device. The format of the data can be plaintext, image, audio, video, or any other formats. The process described herein can be used for encrypting and decrypting any form of data. For example, the data can be a message such as a plaintext message or a media message. In some implementations, an application on the electronic device can initiate a request to encrypt the data.

At 304, the data is divided into working portions. For example, data portions can be implemented as a plurality of blocks. The portions can be the same size or different sizes. One or more portions of the data can be padded before division or during division. In some cases, only one portion is used, e.g., when the size of the data is less than the size of one portion and thus the data is not divided. In some instances, the division of the data can happen later in the encryption process, for example if the data arrives later in pieces. The first portion of the data can initially be set as the "current portion." The current iteration of the encryption process is applied to the current portion of the data.

At 306, an ephemeral key pair is generated. The ephemeral key pair can include an ephemeral public key and an ephemeral private key. In some cases, the ephemeral key pair can be referred to as the anchor point key pair. In some cases, the ephemeral key pair can be an ECC key pair, an RSA key pair, or another type of key pair. In some implementations, the ephemeral public key is saved for output with the final encrypted data. In some cases, the ephemeral key pair is generated based on an entropy source using one or more cryptographic algorithms. Examples of the cryptographic algorithms that can be used to generate the ephemeral key pair includes the Elliptic Curve Cryptography (ECC) key pair generation algorithms, e.g., secp521r1 curve.

At 308, a shared secret is generated. The shared secret can be generated based on a master public key and the ephemeral private key. The master public key can be part of a key pair associated with the data service application. In an asymmetrical cryptography scheme, the key pair can include the master public key and an associated master private key. In some cases, the master public key and the master private key can be generated in an Elliptic Curve Cryptographic (ECC) scheme, an RSA cryptographic scheme, or another type of scheme. In some cases, there is one master key pair associated with the data service application. Alternatively or additionally, the data service application can be associated with more than one master key pairs, and each master key pair is associated with one or more applications that requests to encrypt data. In these cases, the master key pair that is associated with the application that requests to encrypt the data can be used in generating the shared secret.

The shared secret can be generated using the master public key and the ephemeral private key according to an Elliptic Curve Diffie-Hellman (ECDH) technique or another algorithm. An ECDH scheme is an asymmetrical cryptographic scheme using a public-private key pair as in a Diffie-Hellman scheme. The ECDH scheme uses elliptic curve cryptography to provide the key pair and the shared secret. The ephemeral private key can be deleted after the shared secret has been generated.

In some implementations, the shared secret can be generated and shared in another manner. For example, an initial secret can be generated as a random string. The initial secret can be transported, for example, by encrypting it to the public key of the entity. The public-key encrypted secret can be provided as the primary shared secret.

At 310, a current secret key is generated based on the shared secret. In some implementations, a hash, a key derivation function (KDF), or any other cryptographic one-way function can be applied to the shared secret to derive the current secret key. For example, a one-way function such as the National Institute of Standards and Technology (NIST) KDF Alternative 1 using SHA-512 can be used to generate the current secret key. In some cases, a one-way function can be represented as a function $f$. For each x in the domain of $f$, it can be easy to compute $f(x)$; but for substantially all y in the range of $f$, it can be difficult to find any x such that $f(x)=y$.

The current secret key can be used to encrypt the current portion of the data. The current secret key can be an Advanced Encryption Standard (AES) key. In some cases, a current initialization vector (IV), or other current encryption information can also be generated based on the shared secret using a hash, a KDF, or any other cryptographic one-way function. In some cases, a current authentication key, e.g., a current Message Authentication Code (MAC) key, can also be generated based on the shared secret.

At 312, the shared secret is deleted. Deleting the shared secret can prevent the encrypted data from being decrypted by entities other than the private key holder. For example, when the electronic device is locked, other entities on the electronic device cannot retrieve the shared secret from the memory and use the shared secret to generate decryption keys to decrypt the encrypted data.

At 314, the current portion of data is encrypted with the current secret key and the current IV to generate a current ciphertext portion. For example, the encryption can be performed using an AES-256 block cipher in a chained-block cipher (CBC) mode. AES-256 uses a 256-bit key for encryption. In the CBC mode, each block of the data is XORed with the previous encrypted block before being encrypted itself. Therefore, the encryption of each block depends on all previously encrypted blocks.

In some instances, a data integrity algorithm, can be applied to the current ciphertext portion to generate a HMAC tag for the current portion. An example of the data integrity algorithm is a keyed-hash message authentication code (HMAC) algorithm, e.g., the HMAC-SHA-256 algorithm. The data integrity algorithm can use the current authentication key, the current IV, or a combination thereof to generate the HMAC tag for the current portion. The HMAC tag for each portion can be sent to the entity requesting the encryption. The HAMC tags can be used to authenticate the encrypted data during the decryption process.

At 315, whether the current working portion is the last portion of the data is determined. If the current working portion is not the last portion of the data, subsequent portions can be encrypted as part of an iterative process. At 320, a subsequent secret key, subsequent IV, and other encryption and authentication components are generated for the subsequent data portion. The subsequent secret key and the subsequent IV can be generated based on the current secret key and the current IV. For example, using the current secret key and the current IV as input, a KDF can be applied to generate the subsequent secret key and subsequent IV. In some cases, the current HMAC key can also be used as input for the KDF to generate a subsequent HMAC key.

At 322, the current secret key and the current IV are deleted. If the current HMAC key was generated at 310, the current HMAC key is also deleted after the subsequent HMAC is generated. Generally, data may be discarded or deleted in a number of different ways. For example, data may be discarded by removing or deleting a pointer to the data, by setting the corresponding bits in memory to zero or some other default values, by overwriting the data one or more times, by randomizing the values of the corresponding bits in memory, or by another technique. As such, each secret key, IV, authentication key, or shared secrets can be discarded by these or other techniques.

At 324, the subsequent portion of the data is set to be the current portion, the subsequent secret key is set to be the current secret key, and the subsequent IV is set to be the current IV. If the subsequent HMAC key is generated, the subsequent HMAC key is set to the current HMAC key. The new current portion is then encrypted at 314. Any subsequent portions are encrypted similarly as described in 320, 322, and 324.

If the current working portion is the last portion of the data, at 316, the current secret key and the current IV are deleted. At 318, the encrypted data can be sent to the entity requesting the encryption. The encrypted data can include one or more encrypted portions. The ephemeral public key generated at 306 is also sent with the encrypted data. In some cases, the ephemeral public key can be stored with the encrypted data.

In some implementations, an ephemeral key interval can be configured. A new ephemeral key pair can be generated for each ephemeral key interval. In one example, the ephemeral key interval can be set to a number of bytes. For each iteration of the current working portion, the data to be encrypted is accumulated. If the data to be encrypted reaches the configured ephemeral key interval before the last portion of the data is encrypted, the process returns to 306, where a new ephemeral key pair is generated. A new shared secret, and subsequently a new current secret key is generated based on the new ephemeral key pair. A new iteration process using the new current secret key can be used to encrypt the remaining working portions of the data. In some cases, the new ephemeral public key is also sent to the entity requesting the encryption and stored with the remaining encrypted data. If the remaining data exceeds the ephemeral key interval, a third new ephemeral key pair can be generated when the ephemeral key interval is reached again. The process can repeat until the remaining data is encrypted. Alternatively or in combination, the ephemeral key interval can be set to a number of times current secret key is generated. A counter can be configured to keep track each time a current secret key is generated. When the counter reaches the ephemeral key interval and there is remaining data to be encrypted, a new ephemeral key pair can be generated and the counter can be reset to 0. Applying an ephemeral key interval can limit the number of secret keys that are chained, and speed up the decryption process.

Figure 4:
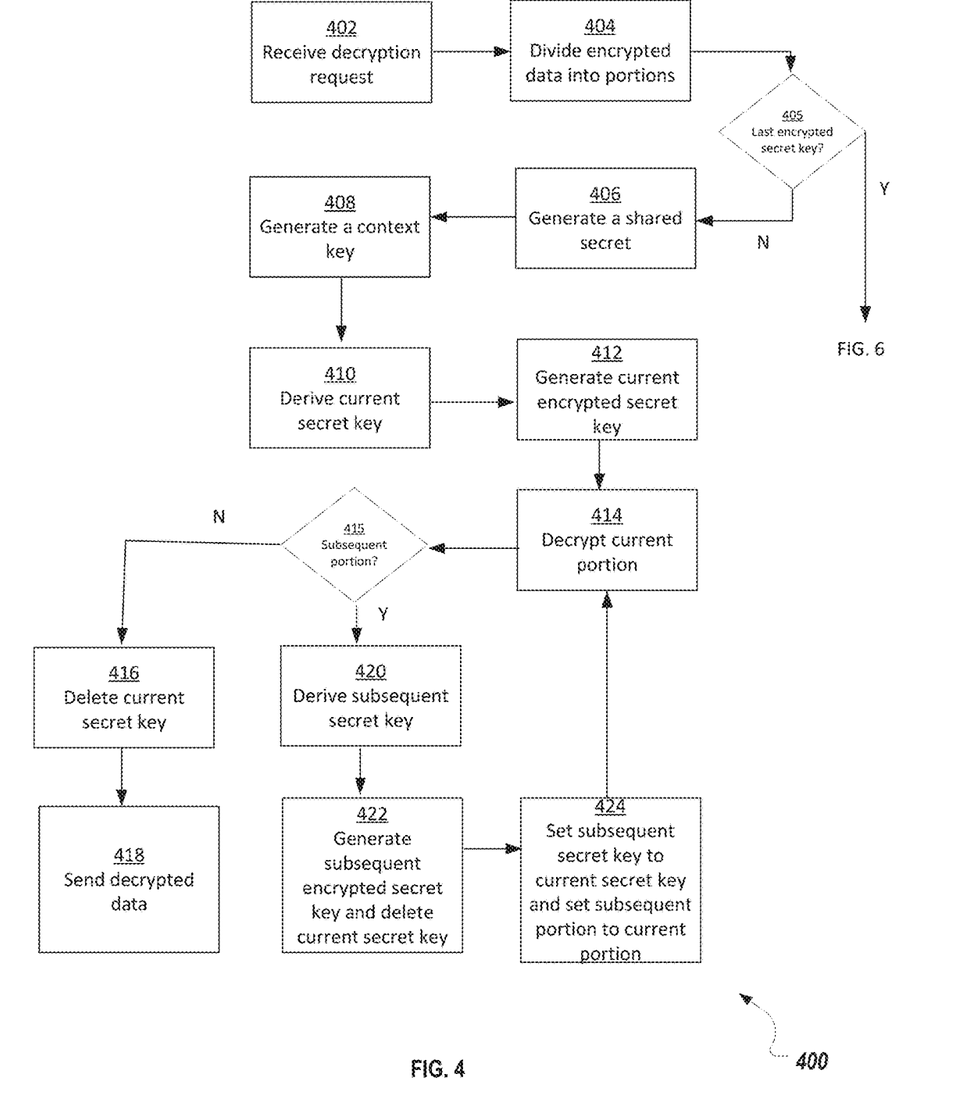
FIG. 4 is a flow diagram showing an example process for decrypting data according to an implementation.

FIG. 4 is a flow diagram showing an example process 400 for decrypting data according to an implementation. The process 400 can be implemented by an electronic device, e.g., the electronic device 102 shown in FIG. 1. The process 400 shown in FIG. 4 can also be implemented using additional, fewer, or different entities. Furthermore, the process 400 shown in FIG. 4 can also be implemented using additional, fewer, or different operations, which can be performed in the order shown or in a different order. In some instances, an operation or a group of the operations can be iterated or repeated, for example, for a specified number of iterations or until a terminating condition is reached.

The example process 400 begins at 402, where a decryption request is received. The decryption request can be received from an application executing on the electronic device. The decryption request can indicate the encrypted data to be decrypted. In some cases, the encrypted data is encrypted by the example process 300 described in FIG. 3. In response to the decryption request, the encrypted data can be retrieved. In some cases, the ephemeral public key can also be retrieved. The ephemeral public key can be stored with the encrypted data in the same file or in a separate file associated with the encrypted data. In some cases, if an authentication algorithm is used in the example process 300 and one or more HMAC tags are stored with the encrypted data, the one or more HMAC tags can also be retrieved. In some cases, the decryption request can indicate one or more segments in the encrypted data to be decrypted. For example, an application can request to read a segment of data at one time, and send another request to read the next segment.

At 404, the encrypted data is divided into working portions. These working portions of the encrypted data can correspond to the working portions of the data used in the encryption process, e.g., at 304 in the example process 300. The first portion of the encrypted data can be set as the current encrypted portion. The current iteration of the decryption process is applied to the current portion of the encrypted data.

Figure 6:
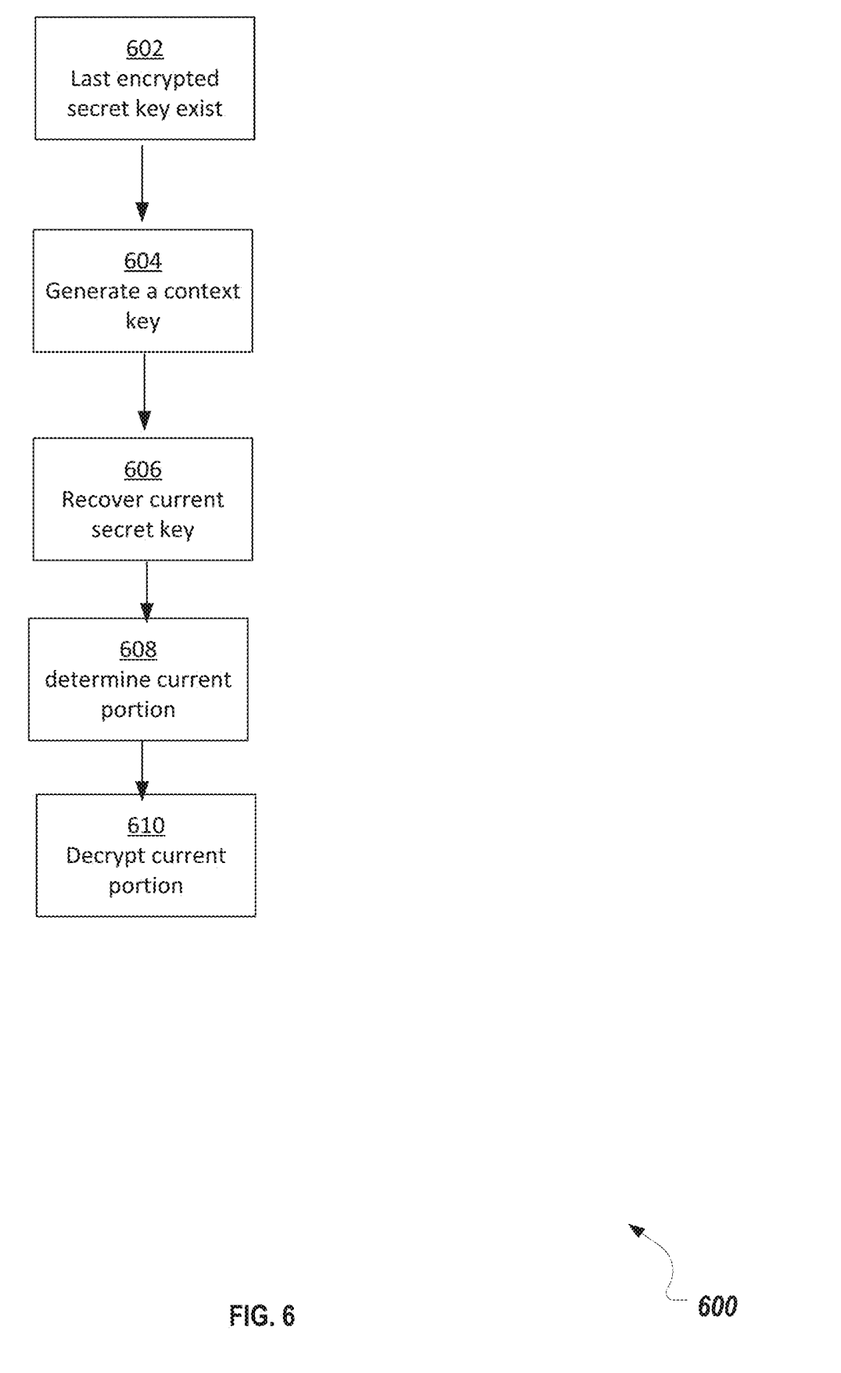
FIG. 6 is a flow diagram showing an example process for decrypting data for a subsequent decryption request according to an implementation.

At 405, whether a last encrypted secret key exists is determined. In some cases, a previous request may have been sent by the application to read a segment of the encrypted data before reaching the end of the encrypted data. As described in more details below, in these cases, a last encrypted secret key can be saved. If the current decrypting request is directed to the same encrypted data, the last encrypted secret key can be used to recover a current secret key for continuing encryption. FIG. 6 and associated descriptions provide additional details of these implementations. In some cases, whether a last encrypted secret key exists can be determined prior to 404.

If the last encrypted secret key does not exist, at 406, a shared secret is generated based on a master private key and the ephemeral public key received at 402. The master private key can be part of a key pair associated with the data service application. The key pair can include the master private key and the associated master public key that is used in the example process 300, e.g., at step 308. The generated shared secret can be the same as the shared secret generated at 308 in the example process 300. The ephemeral public key can be deleted after the shared secret is generated.

At 408, a context key is generated. The context key can be generated based on the master private key. Examples of algorithms that can be used to generate the context key include NIST KDF Alternative 1 using SHA-521.

At 410, a current secret key can be generated based on the shared secret. In some cases, a hash, a KDF, or any other cryptographic one-way function can be used to generate the current secret key. In some cases, the same cryptographic one-way function that is used in the example process 300 for encrypting the data can be used to generate the current secret key for decrypting the data. In some cases, a current IV or a current authentication key can also be generated based on the shared secret. After the current secret key is generated, the shared secret can be deleted.

At 412, a current encrypted secret key can be generated by encrypting the current secret key using the context key. Examples of encryption algorithms that can be used to encrypt the current secret key includes AES256 in CBC mode. In some cases, a current encrypted IV and a current encrypted authentication key can also be generated by encrypting the current IV and the current authentication key respectively.

At 414, the current encrypted portion is decrypted with the current secret key, the current IV, or a combination thereof to generate a current decrypted portion. In some instances, HMAC based on the current authentication key is applied to the current decrypted portion and an HMAC tag is generated. The generated HMAC tag can be compared with the HMAC tag of the corresponding portion of the data received at 402 to verify data authenticity of the current portion of the data.

At 415, whether the subsequent working portion should be decrypted is determined. As discussed previously, in some cases, the decrypting request can indicate one or more segments to be decrypted. The sizes of the segments can be different from the size of the work portion. Therefore, the segments to be decrypted can include one or more working portions. If the segments include data in one or more subsequent work portions, the subsequent portions can be decrypted as part of an iterative process. At 420, a subsequent secret key and a subsequent IV are generated for decrypting the subsequent data portion. The subsequent secret key and the subsequent IV are generated based on the current secret key and the current IV. In some cases, the current secret key and the current IV and used as inputs to a KDF to generate the subsequent secret key and subsequent IV. In some cases, the current authentication key can also be used as input for the KDF to generate a subsequent authentication key.

At 422, a subsequent encrypted secret key can be generated by encrypting the subsequent secret key using the context key. The current secret key, the current IV, the current authentication key, and the current encrypted secret key are deleted. The current encrypted IV and the current encrypted authentication key, if they exist, can also be deleted At 424, the subsequent portion is set to be the current portion, the subsequent secret key is set to be the current secret key, the subsequent IV is set to be the current IV, and the subsequent encrypted secret key is set to be the current encrypted secret key. In some cases, the subsequent authentication key is set to be the current authentication key. The new current portion is then decrypted as at 414. Any subsequent portions are decrypted similarly as described in 420, 422, and 424.

If the current working portion is the last portion to be decrypted according to the decryption request, at 416, the current secret key, the current IV, and the current authentication key are deleted. In some cases, the current encrypted secret key is saved as the last encrypted secret key. In some cases, the current encrypted IV and the current encrypted authentication key are also saved as the last encrypted IV and the last encrypted authentication key, respectively. These saved encrypted keys can be used to recover the current keys for the next decryption request on the same encrypted data.

At 418, the decrypted data are sent to the application that requests decryption. In some cases, the decrypted data can include one decrypted portion or multiple decrypted portions. In some cases, the decrypted data can include part of one decrypted portion that corresponds to segments indicated in the decryption request. In some cases, the results of validating each portion with the HMAC tags are sent to the entity as well. FIG. 6 and associated descriptions provide additional details of these implementations.

In some cases, as described previously, an ephemeral key interval can be configured. When the data is encrypted, a new ephemeral key pair can be generated for each ephemeral key interval. In these cases, during the decrypting process, for each iteration of the current working portion, whether the ephemeral key interval is reached is determined. If the ephemeral key interval is reached and there is remaining data to be decrypted, the process returns to 406, where a new shared secret is generated. A new ephemeral key pair, and subsequently a new current secret key is generated based on the new ephemeral key pair. The process can repeat until the requested segments of data are decrypted.

In some cases, a lock event or an unlock event can be detected during the decryption process. FIG. 5 is a flow diagram showing an example process 500 for decrypting data in association with a lock event or an unlock event according to an implementation. The process 500 can be implemented by an electronic device, e.g., the electronic device 102 shown in FIG. 1. The process 500 shown in FIG. 5 can also be implemented using additional, fewer, or different entities. Furthermore, the process 500 shown in FIG. 5 can also be implemented using additional, fewer, or different operations, which can be performed in the order shown or in a different order. In some instances, an operation or a group of the operations can be iterated or repeated, for example, for a specified number of iterations or until a terminating condition is reached.

The example process 500 begins at 502, where a lock event associated with the encrypted data is detected on the electronic device. In some cases, the lock event is detected during a decryption process of a current portion of the encrypted data. As discussed previously, during the decryption process, a current secret key, a current IV, a current authentication key, or any combinations thereof may be generated to decrypt or authenticate the current portion of encrypted data. In addition, a current encrypted secret key, a current encrypted IV, a current encrypted authentication key, or any combinations thereof may also be generated. A lock event can be triggered by a user interface interaction, e.g., a user can select a user interface object on the electronic device to issue a "lock" command. A lock event can also be triggered by a command sent from an enterprise server associated with the user or the electronic device.

In some cases, the lock event can be directed to the electronic device, which transitions all the data on the electronic device into a locked state. Alternatively, the lock event can be directed to a particular partition of resources on the electronic device, which transitions the particular partition of resources into the locked state. For example, resources of the electronic device can be partitioned into multiple logically separated partitions. Each of the logically separated partitions can have a common management scheme that manages the access of the resources in the respective logically separated partitions and prevents access to these resources from other partitions. In one example, a logically separate partition can be configured for enterprise use, and include applications and data associated with an enterprise. A different logically separate partition can be configured for personal use, and include applications and data associated with personal use. The personal partition can include applications and data for personal use of the user.

When an electronic device or a partition of the electronic device is in a locked state, the data being locked is not accessible by any entities without a master private key. Therefore, when a lock event is detected, the current secret key, the current IV, and the current authentication key are deleted from the memory.

At 504, the context key and the master private key are deleted from the memory. Because the master private key is deleted from the memory, other entities cannot recover the master private key and regenerate the context key. Without the context key, other entities cannot recover the current secret key from the current encrypted secret key.

At 506, an unlock event associated with the encrypted data is detected. An unlock event can be triggered by a user interface interaction, e.g., a user can type a password on the electronic device to issue an "unlock" command. An unlock event can also be triggered by a command sent from an enterprise server associated with the user or the electronic device. An unlock event can be directed to the electronic device or a partition of the electronic device. When an unlock event associated with the encrypted data is detected, the decryption operation of the data can resume.

At 508, the current portion of the encrypted data is determined. In some cases, the current portion of the encrypted data can be determined based on the metadata associated with the encrypted data. The metadata can indicate information of how the data are encrypted. For example, the metadata can indicate the size of the working portions, the size of data and padding included in each working portion, the ephemeral key interval, or other encryption information. Based on the working portions of data decrypted prior to the lock event and the metadata, the current portion of the encrypted data to be decrypted can be determined.

At 510, the current encrypted secret key is retrieved. While the current secret key was deleted, the current encrypted secret key is stored in memory and can be retrieved. In some implementations, the current encrypted IV and the current encrypted authentication key can also be retrieved.

At 512, the context key is regenerated based on the master private key. At 514, the current secret key is regenerated by decrypting the current encrypted secret key using the context key. In some cases, the current encrypted IV and the current encrypted authentication key can also be decrypted to generate the current IV and the current authentication key.

At 516, the current portion of the encrypted data is decrypted using the current secret key, the current IV, or a combination thereof. In some case, the current portion of the encrypted data can also be authenticated using the current authentication key. After decrypting the current portion, the subsequent secret key can be generated based on the current secret key. In some cases, the subsequent IV and the subsequent authentication key can also be generated. The decryption process can continue to the subsequent portion of encrypted data, as described in the example process 400.

In some cases, as discussed previously, the last encrypted secret key exists for the encrypted data. FIG. 6 is a flow diagram showing an example process 600 for decrypting data for a subsequent decryption request according to an implementation. The process 600 can be implemented by an electronic device, e.g., the electronic device 102 shown in FIG. 1. The process 600 shown in FIG. 6 can also be implemented using additional, fewer, or different entities. Furthermore, the process 600 shown in FIG. 6 can also be implemented using additional, fewer, or different operations, which can be performed in the order shown or in a different order. In some instances, an operation or a group of the operations can be iterated or repeated, for example, for a specified number of iterations or until a terminating condition is reached.

The example process 600 begins at 602, where the last encrypted secret key is determined to exist. At 604, the context key is generated based on the master private key. At 606, a last secret key is generated by decrypting the last encrypted secret key. In some cases, a last IV and a last authentication key can be generated by decrypting the last encrypted IV and the last encrypted authentication key, respectively.

At 608, the current working portion to be decrypted is determined. The current working portion corresponds to the beginning the segments indicated in the decryption request. In some cases, the current working portion can be the same working portion that can be decrypted using the last secret key. For example, the segments requested to be decrypted in the previous request are located in the middle of the working portion, and the segments requested to be decrypted in the current request are located in the same working portion. In these cases, the last secret key is set to be the current secret key. The last IV and the last authentication key can be can be set to be the current IV and the current authentication key, respectively.

In some cases, the current working portion is subsequent to the working portion that can be decrypted using the last secret key. For example, the segments requested to be decrypted in the previous request are located at the end of the working portion, and the segments requested to be decrypted in the current request are located in the beginning of the following working portion. In these cases, the last secret key can be used to derive the subsequent secret key, and the subsequent secret key can be set to the current secret key. Similarly, the subsequent IV and the subsequent authentication key can be derived and set to be the current IV and the current authentication key.

At 610, the current working portion is decrypted using the current secret key, the current IV, or a combination thereof. The current working portion can also be authenticated using the current authentication key. The decryption process can continue to the next portion of encrypted data, as described in the example process 400.

Encrypting the current secret key to generate the current encrypted key can provide one or more advantages. For example, the current secret key can be recovered by decrypting the current encrypted secret key. Therefore, the decrypting process can be accelerated. The time and processing power saved may be significant as the number of chained keys increases. Furthermore, during a locked state, the context key is deleted. Therefore, other entities cannot recover the current secret key from the current encrypted secret key without the master private key. Thus the current encrypted secret key provides a secure way to protect the current secret key during a locked state.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method of decrypting encrypted data, the method comprising:
    receiving, from an application on an electronic device, a decryption request to decrypt the encrypted data;
    generating, by a hardware processor of the electronic device, a first secret key from a shared secret, wherein the shared secret is generated based on a master private key and an ephemeral public key associated with the encrypted data;
    encrypting, by the hardware processor of the electronic device, the first secret key to generate a first encrypted secret key by using a context key, wherein the context key is generated based on the master private key;
    decrypting a first portion of the encrypted data using the first secret key;
    generating a second secret key from the first secret key;
    deleting the first secret key;
    decrypting a second portion of the encrypted data using the second secret key;
    deleting the second secret key;
    deleting the first encrypted secret key; and
    sending at least a segment of the decrypted first portion of the encrypted data and at least a segment of the decrypted second portion of the encrypted data to the application.

2. The method of claim 1, wherein the first secret key is generated from the shared secret using a key derivation function, and the second secret key is generated from the first secret key using the key derivation function.

3. The method of claim 1, further comprising:
    prior to deleting the second secret key, generating a third secret key from the second secret key.

4. The method of claim 1, further comprising:
    detecting a lock event; and
    in response to detecting the lock event, deleting the context key and the master private key.

5. The method of claim 1, further comprising:
    detecting an unlock event while in a locked state;
    determining a current portion of the encrypted data for decrypting;
    retrieving a current encrypted secret key;
    generating, by the hardware processor, the context key based on the master private key;
    generating, by the hardware processor, a current secret key by decrypting the current encrypted secret key using the context key; and
    decrypting the current portion of the encrypted data using the current secret key.

6. The method of claim 1, wherein the decryption request indicates one or more segements in the encrypted data to be decrypted, and the method further comprising storing a last encrypted secret key that is used to decrypt a last segment of one or more segments indicated in the decryption request.

7. The method of claim 6, further comprising:
    receiving a second decryption request, wherein the second decryption request indicates a different segment in the encrypted data to be decrypted;
    generating, by the hardware processor, the context key based on the master private key;
    generating, by the hardware processor, a last secret key by decrypting the last encrypted secret key using the context key; and
    decrypting the different segment using the last secret key.

8. An electronic device, comprising:
    a memory; and
    at least one hardware processor communicatively coupled with the memory and configured to:
        receive, from an application on the electronic device, a decryption request to decrypt encrypted data;
        generate a first secret key from a shared secret, wherein the shared secret is generated based on a master private key and an ephemeral public key associated with the encrypted data;

encrypt, the first secret key to generate a first encrypted secret key by using a context key, wherein the context key is generated based on the master private key;

decrypt a first portion of the encrypted data using the first secret key;

generate a second secret key from the first secret key;

delete the first secret key;

decrypt a second portion of the encrypted data using the second secret key;

delete the second secret key;

delete the first encrypted secret key; and send at least a segment of the decrypted first portion of the encrypted data and at least a segment of the decrypted second portion of the encrypted data to the application.

9. The electronic device of claim 8, wherein the first secret key is generated from the shared secret using a key derivation function, and the second secret key is generated from the first secret key using the key derivation function.

10. The electronic device of claim 8, wherein the at least one hardware processor is further configured to:
prior to deleting the second secret key, generate a third secret key from the second secret key.

11. The electronic device of claim 8, wherein the at least one hardware processor is further configured to:
detect a lock event; and
in response to detecting the lock event, delete the context key and the master private key.

12. The electronic device of claim 8, wherein the at least one hardware processor is further configured to:
detect an unlock event while in a locked state;
determine a current portion of the encrypted data for decrypting;
retrieve a current encrypted secret key;
generate the context key based on the master private key;
generate a current secret key by decrypting the current encrypted secret key using the context key; and
decrypt the current portion of the encrypted data using the current secret key.

13. The electronic device of claim 8, wherein the decryption request indicates one or more segments in the encrypted data to be decrypted, and the at least one hardware processor is further configured to store a last encrypted secret key that is used to decrypt a last segment of one or more segments indicated in the decryption request.

14. The electronic device of claim 13, wherein the at least one hardware processor is further configured to:
receive a second decryption request, wherein the second decryption request indicates a different segment in the encrypted data to be decrypted;
generate the context key based on the master private key;
generate a last secret key by decrypting the last encrypted secret key using the context key; and
decrypt the different segment using the last secret key.

15. A non-transitory computer-readable medium containing instructions which, when executed, cause an electronic device to perform operations comprising:
receiving, from an application on the electronic device, a decryption request to decrypt encrypted data;

generating, by a hardware processor of the electronic device, a first secret key from a shared secret, wherein the shared secret is generated based on a master private key and an ephemeral public key associated with the encrypted data;

encrypting, by the hardware processor of the electronic device, the first secret key to generate a first encrypted secret key by using a context key, wherein the context key is generated based on the master private key;

decrypting a first portion of the encrypted data using the first secret key;

generating a second secret key from the first secret key;

deleting the first secret key;

decrypting a second portion of the encrypted data using the second secret key;

deleting the second secret key;

deleting the first encrypted secret key; and sending at least a segment of the decrypted first portion of the encrypted data and at least a segment of the decrypted second portion of the encrypted data to the application.

16. The non-transitory computer-readable medium of claim 15, wherein the first secret key is generated from the shared secret using a key derivation function, and the second secret key is generated from the first secret key using the key derivation function.

17. The non-transitory computer-readable medium of claim 15, the operations further comprising:
prior to deleting the second secret key, generating a third secret key from the second secret key.

18. The non-transitory computer-readable medium of claim 15, the operations further comprising:
detecting a lock event; and
in response to detecting the lock event, deleting the context key and the master private key.

19. The non-transitory computer-readable medium of claim 15, the operations further comprising:
detecting an unlock event while in a locked state;
determing a current portion of the encrypted data for decrypting;
retrieving a current encrypted secret key;
generating, by the hardware processor, the context key based on the master private key;
generating, by the hardware processor, a current secret key by decrypting the current encrypted secret key using the context key; and
decrypting the current portion of the encrypted data using the current secret key.

20. The non-transitory computer-readable medium of claim 15, wherein the decryption request indicates one or more segments in the encrypted data to be decrypted, and the operations further comprising storing a last encrypted secret key that is used to decrypt a last segment of one or more segments indicated in the decryption request.

* * * * *

UNITED STATES PATENT AND TRADEMARK OFFICE
CERTIFICATE OF CORRECTION

PATENT NO.        : 10,341,102 B2
APPLICATION NO.   : 15/255960
DATED             : July 2, 2019
INVENTOR(S)       : Roger Paul Bowman and Dmitri Pechkin It is certified that error appears in the above-identified patent and that said Letters Patent is hereby corrected as shown below:

In the Claims

Column 18, Line 32, In Claim 5, delete "determing" and insert -- determining --, therefor.

Column 18, Line 43, In Claim 6, delete "segements" and insert -- segments --, therefor.

Column 19, Line 42, In Claim 13, delete "segements" and insert -- segments --, therefor.

Column 20, Line 42, In Claim 19, delete "determing" and insert -- determining --, therefor.

Column 20, Line 56, In Claim 20, delete "segements" and insert -- segments --, therefor.

Signed and Sealed this
Fifth Day of November, 2019

Andrei Iancu
*Director of the United States Patent and Trademark Office*